United States Patent
Knish et al.

(10) Patent No.: US 11,870,476 B2
(45) Date of Patent: Jan. 9, 2024

(54) SYSTEM AND METHOD FOR MULTIPLE WIRELESS SYSTEMS OF A VEHICLE TO SHARE CABLING

(71) Applicant: GM GLOBAL TECHNOLOGY OPERATIONS LLC, Detroit, MI (US)

(72) Inventors: George Knish, Rochester Hills, MI (US); Jang Hwan Oh, Troy, MI (US); Lakshmi V. Thanayankizil, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 57 days.

(21) Appl. No.: 17/725,820

(22) Filed: Apr. 21, 2022

(65) Prior Publication Data
US 2023/0344457 A1    Oct. 26, 2023

(51) Int. Cl.
H04B 1/3822 (2015.01)
H04B 1/401 (2015.01)
H04W 28/02 (2009.01)
H04W 88/06 (2009.01)

(52) U.S. Cl.
CPC ........... *H04B 1/3822* (2013.01); *H04B 1/401* (2013.01); *H04W 28/0215* (2013.01); *H04W 88/06* (2013.01)

(58) Field of Classification Search
CPC . H04B 1/3822; H04B 1/401; H04W 28/0215; H04W 88/06
See application file for complete search history.

(56) References Cited

U.S. PATENT DOCUMENTS

| | | | |
|---|---|---|---|
| 8,150,454 B2* | 4/2012 | Sanders | H04B 7/0814 |
| | | | 455/552.1 |
| 9,331,835 B1* | 5/2016 | Lee | H04B 1/0057 |
| 9,648,538 B2 | 5/2017 | Ganesan | |
| 9,813,206 B2* | 11/2017 | Kim | H04W 24/02 |
| 9,955,493 B1 | 4/2018 | Thanayankizil et al. | |
| 9,992,735 B1 | 6/2018 | Crosbie et al. | |
| 10,383,045 B2 | 8/2019 | Thanayankizil | |
| 10,498,521 B2* | 12/2019 | Little | H04B 1/48 |
| 10,887,808 B1 | 1/2021 | McPhee et al. | |
| 11,089,529 B1 | 8/2021 | Lekutai | |
| 11,212,683 B1 | 12/2021 | Hartley et al. | |
| 11,362,414 B2* | 6/2022 | Jamaly | H01Q 13/203 |
| 11,522,591 B2* | 12/2022 | Hwang | H04B 7/0617 |
| 11,631,938 B2* | 4/2023 | Jha | H01Q 9/065 |
| | | | 343/702 |
| 2005/0057426 A1* | 3/2005 | Itkin | H04B 1/3877 |
| | | | 343/702 |

(Continued)

*Primary Examiner* — Dominic E Rego
(74) *Attorney, Agent, or Firm* — Quinn IP Law

(57) ABSTRACT

A system for multiple wireless systems of vehicle to share cabling. The system may include a plurality of first antennas to interface signals with a first transceiver as part of a first wireless system and a plurality of second antennas to interface signals with a second transceiver as part of a second wireless system. The system may include a first switch configured to selectively connect the first and second antennas to first and second cables and a second switch configured to selectively connect the first and second transceivers to the first and second cables such that the first and second antennas and transceivers share the first and second cables.

18 Claims, 3 Drawing Sheets

(56) References Cited

U.S. PATENT DOCUMENTS

| | | | |
|---|---|---|---|
| 2007/0142001 A1* | 6/2007 | Sanders | H04B 1/006 |
| | | | 455/101 |
| 2008/0043687 A1* | 2/2008 | Lee | H04W 84/005 |
| | | | 370/310.2 |
| 2010/0164790 A1 | 7/2010 | Wisnewski et al. | |
| 2012/0326942 A1* | 12/2012 | Simmons | H01Q 21/20 |
| | | | 343/876 |
| 2014/0170990 A1* | 6/2014 | Black | H04B 1/401 |
| | | | 455/73 |
| 2014/0353300 A1* | 12/2014 | Swiatek | H05B 3/34 |
| | | | 219/211 |
| 2015/0110229 A1* | 4/2015 | Kim | H04L 25/03821 |
| | | | 375/347 |
| 2017/0310014 A1* | 10/2017 | Liu | H01Q 1/50 |
| 2018/0026363 A1* | 1/2018 | Bevelacqua | H01Q 9/42 |
| | | | 343/700 MS |
| 2018/0367209 A1* | 12/2018 | Jamaly | B61L 1/181 |
| 2018/0372832 A1* | 12/2018 | Ko | G01S 13/84 |
| 2019/0036217 A1* | 1/2019 | Presti | H01Q 5/50 |
| 2020/0136681 A1* | 4/2020 | Chien | H04B 1/40 |
| 2020/0185818 A1* | 6/2020 | Kim | H01Q 1/241 |
| 2020/0185819 A1* | 6/2020 | Kim | H01Q 1/3208 |
| 2021/0271238 A1* | 9/2021 | Ko | H01Q 21/28 |
| 2022/0105971 A1* | 4/2022 | Winter | H01Q 1/3225 |
| 2022/0416836 A1* | 12/2022 | Rao | H04B 1/40 |
| 2023/0033577 A1* | 2/2023 | Shah | H04L 12/40 |
| 2023/0077767 A1* | 3/2023 | Beaudin | H04B 1/0057 |
| | | | 455/552.1 |

* cited by examiner

SYSTEM AND METHOD FOR MULTIPLE WIRELESS SYSTEMS OF A VEHICLE TO SHARE CABLING

INTRODUCTION

The present disclosure relates to sharing cables, wiring, fiber, and/or other physical media amongst multiple systems of a vehicle, such as to facilitate sharing cables between antennas and transceivers.

A vehicle may include any number of systems to facilitate any number of vehicle related operations, with more and more of those operations being dependent on some type of wireless signaling. These wireless dependent systems are often additionally reliant on some variety of cabling to provide a backbone or a backhaul kind of infrastructure to facilitate wiredly exchanging signals with other endpoints aboard the vehicle, e.g., between antennas and transceivers. The use of such cabling and other physical media for wired communications, particularly with high production vehicles like automobiles, necessitates complex and costly manufacturing and packaging to snake the cabling between door panels, flooring, and other hard-to-reach places within the vehicle and also increases individual component costs and overall vehicle weight with each one of the ever-increasing number of cables being added.

SUMMARY

Disclosed herein is a solution for mitigating the amount of cabling, wiring, fiber, and/or other physical media included in a vehicle or other device. One non-limiting aspect of the present disclosure contemplates a system for multiple endpoints in a vehicle to share cabling as a means for wiredly exchanging signals. The system may include a plurality of switches configured to selectively connect endpoints to the shared cabling in a manner that effectively appears to the endpoints as if a dedicate, independent cable was instead being used to hardwire the endpoints together. The switches may be operable to selectively connect one or more of the endpoints to the shared cabling with the consequence of the unconnected endpoints being disconnected and unable to communicate over the shared cabling. Another non-limiting aspect of the present disclosure contemplates a method for controlling the switches, and thereby the connection and disconnection of endpoints, according to operating characteristics of the vehicle to ensure the more important endpoints are entitled to access the shared cabling when needed.

The present disclosure may be implemented without an awareness or understanding of the endpoints and/or without requiring the endpoints to engage in collision avoidance or otherwise adopt or manipulate operations to account for use of the shared cabling. The switches, in other words, may be implemented and controlled to facilitate use of the shared cabling without the endpoints having a priori knowledge or otherwise being aware of other endpoints sharing the same cabling. The shared cabling and situational control of the switches may effectively result in the endpoints acting as if connected to dedicated, independent cabling. The ability of the present disclosure to enable sharing without disrupting operations of the endpoints may be beneficial in enabling the endpoints to operate in a normal manner and without having to provide collision avoidance or other types of network related addressing and protocol variations typically used for nodes or other network elements to commonly communicate over a network.

The present teachings contemplate a system for multiple wireless systems of a vehicle to share cabling. The system may include a plurality of first antennas to interface signals with a first transceiver as part of a first wireless system and a plurality of second antennas to interface signals with a second transceiver as part of a second wireless system. The system may include a first switch configured to selectively connect the first and second antennas to first and second cables and a second switch configured to selectively connect the first and second transceivers to the first and second cables such that the first and second antennas and transceivers share the first and second cables.

The system may include a controller configured to actuate the first and second switches between at least a first state and a second state where the first state connects each of the first antennas and the first transceiver to one of the first and second cables and the second state connects each of the second antennas and the second transceiver to one of the first and second cables.

The system may include a plurality of third antennas to interface signals with the first transceiver such that the third antennas separately connect to the first transceiver with one of a plurality of third cables independent of the first and second cables.

The system may include a plurality of fourth antennas to interface signals with a third transceiver of a third wireless system such that the fourth antennas separately connected to the third transceiver with one of a plurality of fourth cables independent of the first, second, and third cables.

The system may include the first transceiver being a 4×4 multiple-input-multiple-output (MIMO) transceiver and the second and third transceivers being 2×2 MIMO transceivers.

The system may include the first and second switches being double pole, double throw (DPDT) switches.

The controller may include a computer readable storage medium and a processor with the storage medium including a plurality of non-transitory instructions executable with the processor to selectively control the first and second switches between the first and second states.

The non-transitory instructions may be configured to: implement a key feature process for controlling the first and second switches to the second state in response to determining the vehicle to be requesting usage of a key feature; implement a location process for controlling the first and second switches to the second state in response to determining the vehicle to be within a range of a known wireless access point (AP); and implement a speed process for controlling the first and second switches to the second state in response to determining the vehicle to be traveling at a speed below a speed threshold.

The non-transitory instructions may be configured to: control the first and second switches to the second state regardless of a quality of service (QoS) for signaling associated with the second antennas when implementing either of the key feature and the location processes; and control the first and second switches from the second state to the first state in response to the QoS failing to meet a QoS threshold when implementing the speed process.

The non-transitory instructions may be configured to implement a host selection process as part of each of the key feature, location and speed processes where the host selection process selects connection parameters to be provided to the second transceiver for use in establishing a connection through the second antennas with a host.

The non-transitory instructions may be configured to implement a post-switch scanning process in response to the connection parameters being unavailable prior to implementing one of the key feature, location, and speed processes where the post-switching scanning process determines the connection parameters.

The non-transitory instructions may be configured to implement a pre-switch scanning process in an attempt to determine the connection parameters prior to implementing one of the key feature, location, and speed processes.

The non-transitory instructions may be configured to implement a default process for controlling the first and second switches to the first state in response to the key feature, location, and speed processes being inactive.

The system non-transitory instructions may be configured to implement a triggering process as part of the default process whereby the triggering process temporarily switches the first and second switches from the first state to the second state for purposes of performing the pre-switch scanning process whereafter the first and second switches are automatically switched from the second state to the first state.

The non-transitory instructions may be configured to control the first and second switches to the first state when a cellular mode is active and to control the first and second switches to the second state when a non-cellular mode is active.

The non-transitory instructions may be configured to deactivate the non-cellular mode and activate the cellular mode when a quality of service (QoS) for signaling occurring through the second antennas during the non-cellular mode is below a QoS threshold.

The non-transitory instructions may be configured to implement a host selection process as part of the non-cellular mode whereby the host selection process selects connection parameters to be provided to the second transceiver to establish a connection through the second antennas with a host.

The non-transitory instructions may be configured to implement a pre-switch scanning process during the cellular mode in an attempt to determine the connection parameters prior to implementing the non-cellular mode where the pre-switch scanning process includes temporarily switching the first and second switches from the first state to the second state for purposes of determining the connection parameters whereafter the first and second switches may be automatically switched from the second state to the first state.

The present teachings contemplate a method for multiple wireless systems of a vehicle to share cabling. The method may include determining a plurality of operating characteristics for the vehicle and thereafter controlling an antenna switch to a first position in response to the operating characteristics indicating the vehicle to be operating according to a first mode and controlling the antenna switch to a second position in response to the operating characteristics indicating the vehicle to operating according to a second mode. The first position may connect each of a plurality of first antennas to one of a plurality of cables included as part of the cabling such that the first position prevents each of a plurality of second antennas from connecting to one of the cables. The second position may connect each of the second antennas to one of the cables where the second position prevents each of the first antennas from connecting to one of the cables. The first antennas may be part of a first wireless system of the multiple wireless systems, and the second antennas may be part of a second wireless system of the multiple wireless systems. The method may include controlling a transceiver switch to a third position in response to the vehicle operate according to the first mode and controlling the transceiver switch to a fourth position in response to the vehicle operate according to the second mode. The third position may connect a first transceiver to each of the cables such that the third position prevents a second transceiver from connecting to the cables. The fourth position may connect the second transceiver to each of the cables such that the second position prevents the first transceiver from connecting to one of the cables. The first transceiver may be part of the first wireless system, and the second transceiver may part of the second wireless system.

A system for Wi-Fi and cellular systems of a vehicle to share a plurality of cables used to connect a plurality of Wi-Fi antennas with a Wi-Fi transceiver and to connect a plurality of cellular antennas with a cellular transceiver. The Wi-Fi and cellular systems being required to share the cables due to a quantity of the cables being less than a total quantity of the Wi-Fi and cellular antennas. The system may include an antenna switch operable between at least a first position and a second position where the first position connects the cellular antennas to the cables and the second position connects the Wi-Fi antennas to the cable. The system may include a transceiver switch operable between at least a third position and a fourth position where the third position connects the cellular transceiver to the cables and the fourth position connects the Wi-Fi transceiver to the cable.

The above features and advantages, and other features and attendant advantages of this disclosure, will be readily apparent from the following detailed description of illustrative examples and modes for carrying out the present disclosure when taken in context with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The above features and advantages and other features and advantages of the present teachings are readily apparent from the following detailed description of the modes for carrying out the present teachings when taken in connection with the accompanying drawings. It should be understood that even though in the following embodiments may be separately described, single features thereof may be combined to form additional embodiments.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
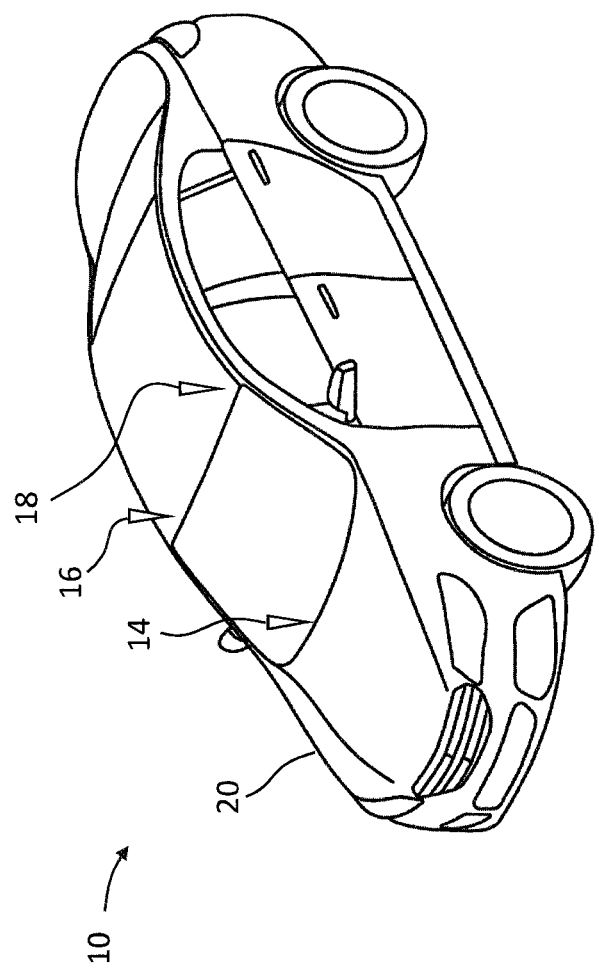
FIG. 1 Illustrates a perspective view of a system for sharing cabling in accordance with one non-limiting aspect of the present disclosure.
Figure 2:
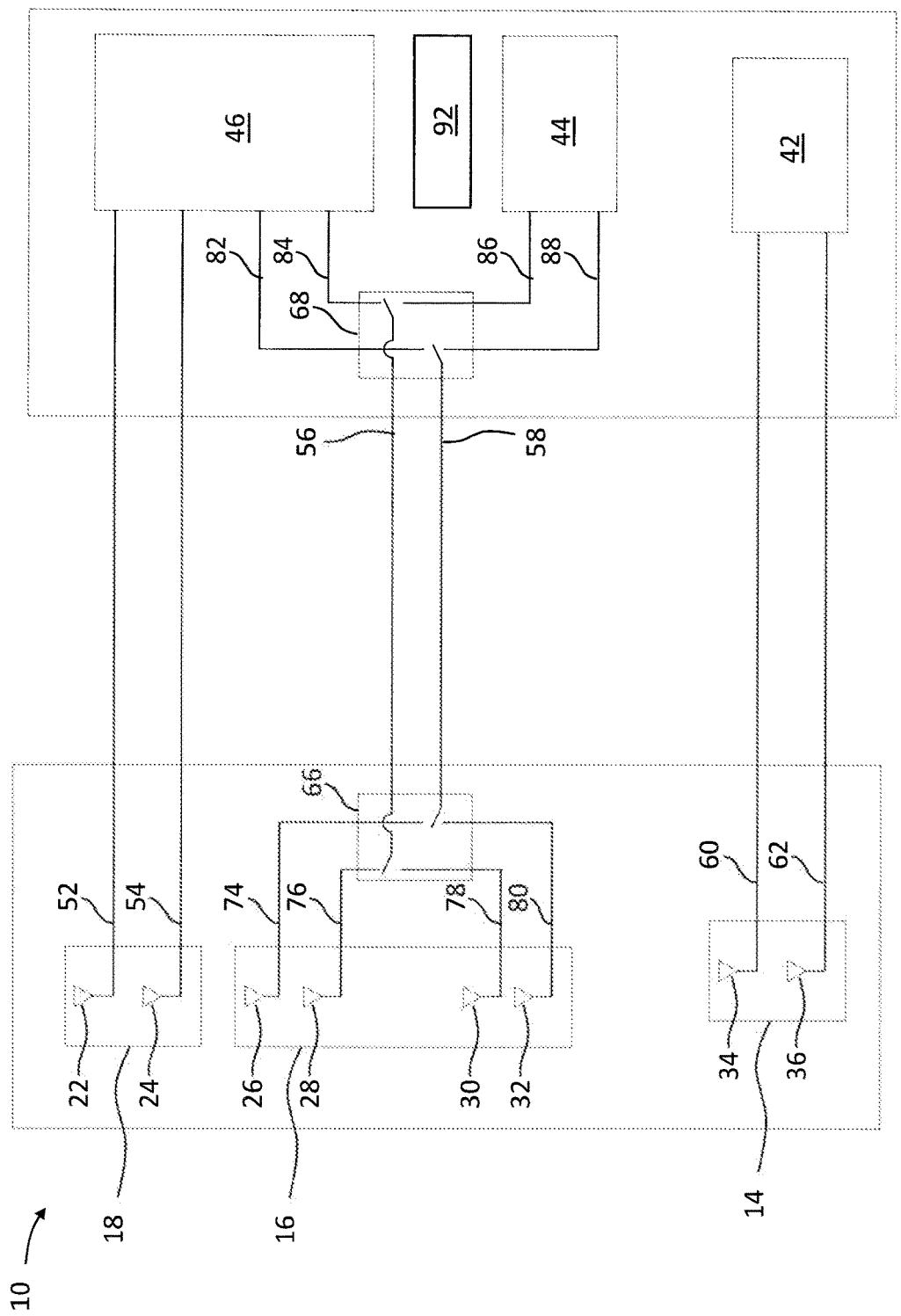
FIG. 2 illustrates a schematic view of the system in accordance with one non-limiting aspect of the present disclosure.

FIG. 1 illustrates a perspective view of a system 10 for multiple systems 14, 16, 18 of a vehicle 20 to share cabling in accordance with one non-limiting aspect of the present disclosure. FIG. 2 illustrates a schematic view of the system 10 where the multiple systems, 14, 16, 18 are illustrated for exemplary non-limiting purposes as being antenna arrays comprised of a plurality of individual antennas 22, 24, 26, 28, 30, 32, 34, 36. The antennas 22, 24, 26, 28, 30, 32, 34, 36 are shown individually to demonstrate one non-limiting aspect of the present disclosure associated with facilitating multiple-input-multiple-output (MIMO) type of wireless communications. The antennas 22, 24, 26, 28, 30, 32, 34, 36 may be of any suitable type and configured to facilitate virtually any type of wireless communication, and as such, need not be the illustrated standalone, independent, antennas, e.g., the antennas 22, 24, 26, 28, 30, 32, 34, 36 may be smart antennas or arrayed antennas having omnidirectional or directional capabilities, etc.

The antennas 22, 24, 26, 28, 30, 32, 34, 36 are presented as an exemplary aspect whereby the wireless systems 14, 16, 18 may be employed to facilitate wireless communications internally and externally to the vehicle 20. Each of the antennas 22, 24, 26, 28, 30, 32, 34, 36 may be configured to facilitate exchanging resulting wired signaling with a corresponding transceiver 42, 44, 46, which for exemplary purposes are shown to correspond with an 2×2 MIMO, internal Wi-Fi transceiver 42, a 2×2 MIMO, external Wi-Fi transceiver 44, and a 4×4 MIMO, Long Turn Evolution (LTE)/transceiver 46. The system 10 is shown to rely on a plurality of physical media 52, 54, 56, 58, 60, 62 to establish non-wireless connections between each of the antennas 22, 24, 26, 28, 30, 32, 34, 36 and an associated one of the transceivers 42, 44, 46. The physical media is intended to represent any suitable material or structure capable of non-wirelessly exchanging signals between endpoints, and is hereinafter predominately referred to as cabling or cables.

The present disclosure predominately refers to such physical media 52, 54, 56, 58, 60, 62 as cabling for exemplary non-limiting purposes as the terms "cabling" and "physical media" are intended to generically and non-specifically reference any suitable medium for wiredly establishing an electrical connection sufficient for communicating signaling, which may additionally include etchings, wirings, soldering, coaxial cables, harnesses, etc. The use of electrical connections to facilitate wiredly communicating signaling between endpoints is also presented for exemplary non-limiting purposes as the present disclosure fully contemplates its use and application in facilitating other types of non-wireless communication, such as communications performed through optical signal processing over fiber optics whereby cabling may be used to facilitate optically communicating signaling without establishing electrical connections between endpoints. The illustrated cabling 52, 54, 56, 58, 60, as such, is merely illuminated for purposes of demonstrating the quantity and the significance of a portion of a much greater amount of cabling typically included within the vehicle 10.

The cabling 52, 54, 56, 58, 60, 62, also need not be of an identical or similar type, i.e., some of the cables 52, 54, 56, 58, 60, 62 may be different than other cables 52, 54, 56, 58, 60, 62 and other factors like distance and space may be determinate of the material properties of the cabling 52, 54, 56, 58, 60, 62, particularly with respect to relative distance between the endpoints being connected. The cabling 52, 54, 56, 58, 60, 62 may be used to provide a backbone or a backhaul where each cable 52, 54, 56, 58, 60, 62 necessitates complex and costly manufacturing and packaging to snake through door panels, flooring, and other hard-to-reach places within the vehicle 20 such that each unnecessary cable 52, 54, 56, 58, 60, 62 increases individual component costs and overall vehicle weight. One non-limiting aspect of the present disclosure contemplates eliminating or otherwise mitigating the number of cables 52, 54, 56, 58, 60, 62 used in the vehicle 20 by enabling one or more of the cables 56, 58 to be shared by multiple endpoints.

The system 10 is shown for exemplary purposes with the cables 56, 58 being shared between antennas (endpoints) 26, 28, 30, 32 and transceivers (endpoints) 44, 46. The cables 56, 58 may be characterized as shared when more than two endpoints are configured to make use of the same physical media. One non-limiting aspect of the present disclosure contemplates including a plurality of double pole, double throw (DPDT) switches, 66, 68, or other type of switches, including smart switches, to selectively connect the antennas 26, 28, 30, 32 and the transceivers 44, 46 with the shared cabling 56, 58 (switch cabling) in a manner that effectively appears to the antennas 26, 20, 30, 32 and transceivers 44, 46 as if a dedicated, independent cable was instead being used as a permanent hardwired connection. The switches 66, 68 are shown to be selectively controlled between a first state or first position and a second state or second position. The antenna switch 66 is shown to be in the first position to establish a connection between the antenna 26 and the shared cable 58 and another connection between the antenna 28 and the shared cable 56. The transceiver switch 68 is also shown to be in the first position to establish separate connections between the transceiver 46 and the shared cable 56, 58. The switches 66, 68 may be controlled to the second position to similarly establish separate connections between the shared cables 56, 58 and the antennas 30, 32 and transceiver 44.

A plurality of traces, interfaces, wires, and the like 74, 76, 78, 80, 82, 84, 86, 88 may be configured to facilitate interfacing the switches 66, 68 with the antennas 26, 28, 30, 32 and the transceivers 44, 46. The traces 74, 76, 78, 80, 82, 84, 86, 88 may be included as part of the system 16, i.e., integral with the antennas 26, 28, 30, 32, as part of the switches 66, 68, and/or independent features. The traces 74, 76, 78, 80, 82, 84, 86, 88 are shown for exemplary purposes as demonstrating one non-limiting mechanism for enabling standalone or independent switches 66, 68 to be connected to the antennas 26, 28, 30, 32 and the transceivers 44, 46 and/or to enable the connected to antennas 26, 28, 30, 32 and transceivers 44, 46 to be manufactured without regard to the switches 66, 68 and without having to be particularly designed to accommodate the switches 66, 68. This lack of awareness or understanding of the switches 66, 68 may enable the sharing to occur without requiring the antennas 26, 28, 30, 32 and the transceivers 44, 46 to engage in collision avoidance or otherwise adopt or manipulate operations to account for use of the shared cabling 56, 58. The switches 66, 68, in other words, may be implemented and controlled to facilitate use of the shared cabling 56, 58 without the antennas 26, 28, 30, 32 and the transceivers 44, 46 having a priori knowledge or otherwise being aware of other endpoints sharing the same cabling.

The ability of the present disclosure to enable sharing without disrupting operations of the endpoints may be beneficial in enabling the endpoints to operate in a normal manner and without having to provide collision avoidance or other types of network related addressing and protocol variations typically used for nodes or other network elements to commonly communicate over a network. To assure some level of adequate control in metering use of the shared cables 56, 58 and to facilitate communicating information to or otherwise apprising the endpoints of the state of the switches 66, 68, one non-limiting aspect of the present disclosure contemplates including a controller 92. The controller 92 may be included to facilitate selectively controlling the switches 66, 68 between the first and second positions and otherwise determining strategy for dictating the connections made through the shared cables 56, 58. The controller 92 may be in communication with a vehicle bus (not shown) or other information system included within the vehicle 10, e.g., additional modules included within the vehicle 20 for purposes of monitoring any number of vehicle operations. The controller 92 may include a computer readable storage medium (not shown) and a processor (not shown) with the storage medium including a plurality of non-transitory instructions executable with the processor to selectively control the switches 66, 68.

Figure 3:
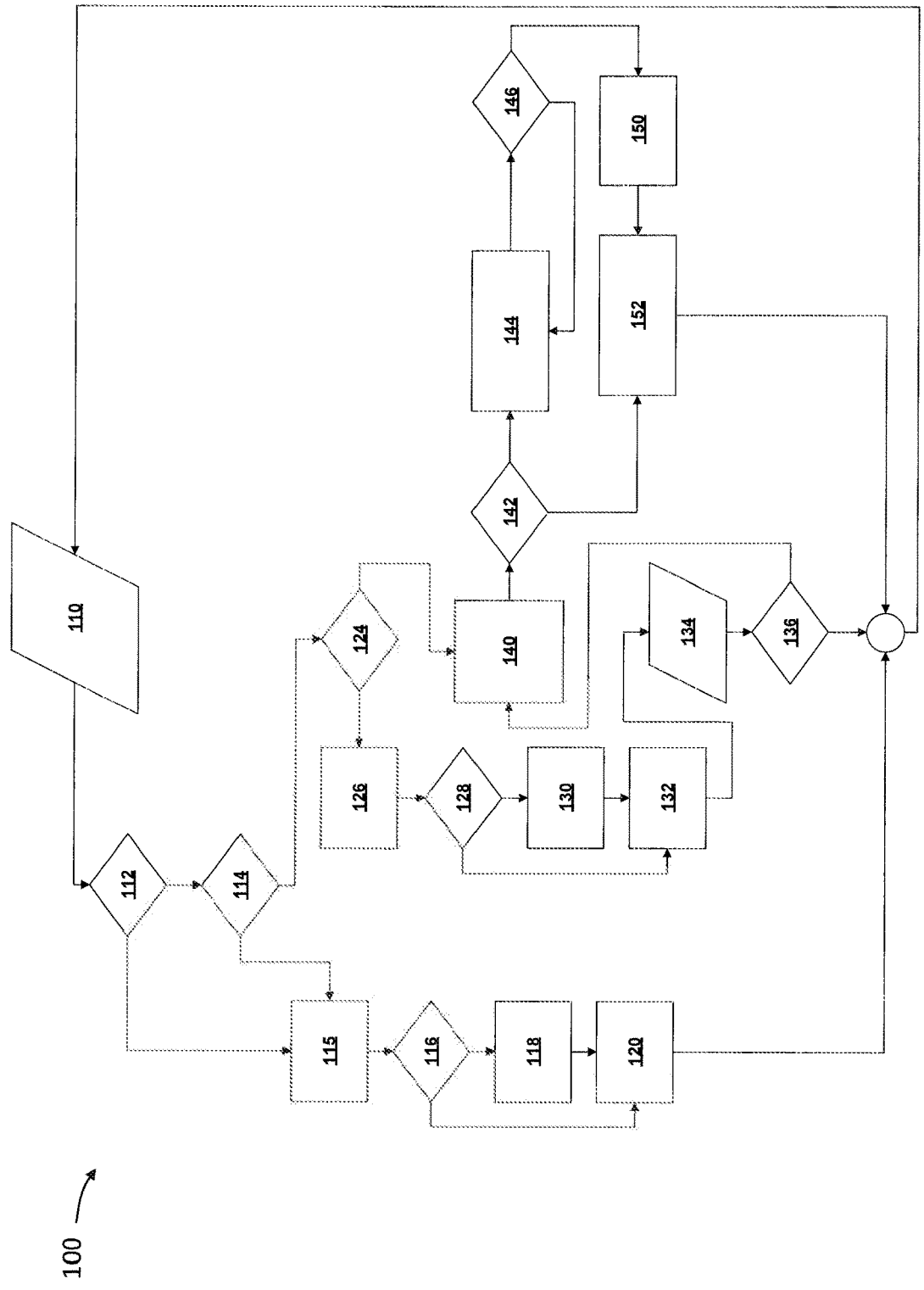
FIG. 3 illustrates a flowchart of a method for selectively sharing cabling in accordance with one non-limiting aspect of the present disclosure.

FIG. 3 illustrates a flowchart 100 of a method for selectively controlling the switches 66, 68 in accordance with one non-limiting aspect of the present disclosure. The method may be facilitated with the controller 92 executing related instructions and/or with operations executed by or in cooperation with other devices of the vehicle 10 being correspondingly programmed to facilitate the operations and processes contemplated herein.

The method is predominately described with respect to the switches 66, 68 being controllable between a first position and a second position to selectively connect and disconnect the antennas 26, 28, 30, 32 and the transceivers 44, 46 to the shared cabling 56, 58. This is done for exemplary non-limiting purposes of the present invention fully contemplates its use and application in facilitating cable sharing between other types of endpoints, including non-wireless endpoints, systems, and devices, and optionally with switches having capabilities to selectively connect and disconnect more than the illustrated quantity of endpoints, e.g., multiple pole and/or multiple throw switches. The exemplary application of the present disclosure facilitating cable sharing between the antennas 26, 28, 30, 32 and the transceivers 44, 46, i.e., for wireless systems employing cabling to connect one component with another, is believed to be particularly beneficial due to the infrequency at which the antennas 26, 20, 30, 32 may be used and/or due to the functions supported thereby typically being non-critical. In other words, the corresponding systems may be amenable to being connected and disconnected due to their usage variations and relatively non-essential influence on critical operations of the vehicle 10.

Block 110 relates to a polling process or information collection process whereby the controller 92 communicates with various modules, control units, etc., within the vehicle 10 to obtain a plurality of vehicle operating characteristics. One non-limiting aspect of the present disclosure contemplates the multiple systems sharing the cables 56, 58 being tasked with supporting cellular and non-cellular communications, such as but not necessarily limited to LTE/5G cellular and Wi-Fi based communications. The differentiation between protocol and type of the wireless communication is merely presented for non-limiting purposes to demonstrate one manner for controlling the switches 66, 68 according to operational needs and desires for the vehicle 10. The distinction between cellular and non-cellular communications characterizes one such scenario whereby there may be times when Wi-Fi communications may be preferred over cellular communications, such as due to cost, throughput, preferences, etc., and likewise where there may be times where 4×4 MIMO cellular communications may be preferred over the 2×2 MIMO available when the antennas 26, 28 are disconnected, such as when Wi-Fi is unavailable and/or when cellular signaling is weaker or requires maximum throughput.

Blocks 112, 114 respectively relate to implementing a key feature process and a location process for controlling the switches 66, 68 to the second state or position, which may be referred to as a Wi-Fi position, for purposes of connecting the antennas 30, 32 and the Wi-Fi transceiver 44 to the shared cables 56, 58. The key feature process may relate to determining whether the operating characteristics indicate a desire to implement a key feature for the vehicle 10. The key feature may relate to Wi-Fi dependent communications, such as those associated with trailering camera connectivity, etc. The location process may be analogous to the key feature process in so far as indicating a scenario where Wi-Fi functionality may be beneficial, such as a function of GPS coordinates or other location information, e.g., presence of vehicle 10 at a dealership or other preferred location indicating the vehicle may require Wi-Fi communications to facilitate servicing, advertising, etc. The key feature process is illustrated to be separate from the location process to demonstrate one type of control based on user selection (key feature process) and another type of pre-programmed or non-user selected control (location process).

Box 115 relates to the controller 92 controlling the switches 66, 68 to the Wi-Fi position to thereby connect the antennas 30, 32 and the transceiver 44 through the shared cables 56, 58, i.e., to induce a Wi-Fi mode. Block 116 relates to the controller 92 implementing a host selection process for determining connection parameters for use in connecting the antennas 30, 32 to a host. The connection parameters may relate to information utilized by the transceiver 44 to establish Wi-Fi communications. Block 118 relates to performing a post-switched scanning process whereby the controller 92 instructs the transceiver 44 to perform a scan for available Wi-Fi networks due to a Wi-Fi host being unselected or the connection parameters being unavailable or unreliable at a time of actuating the switches 66, 68 to the Wi-Fi position. The scan may include identifying connection parameters and other information for each Wi-Fi network within range, e.g., network name (SSID), media access control (MAC) address, modes (e.g., 802.11a/b/g/n/ac), frequency bands (2.4 GHz, 5 GHz), channel width (20, 40, 80, and 160 MHz), security mode (WEP, WPA, WPA2), etc. Block 120 relates to the host the controller 92 selecting a host or a access point (AP) and communicating corresponding connection information to the transceiver 44. The selected host/AP may be determined based on priority, preferences, throughput, signaling strength, etc. The selection thereof may also be based on the type of key feature and/or the location, e.g., certain key features may have preferences for particular hosts, e.g., a trailer AP, and/or certain locations may have preferences for particular hosts, e.g., dealership or charging station AP.

In the event both of Blocks 112, 114 failed to indicate a need for controlling the switches 66, 68 to the Wi-Fi position, Block 124 relates to implementing a speed process for determining whether the vehicle is traveling at a speed amenable to Wi-Fi communications. Given the typically lower cost of Wi-Fi communications in comparison to cellular communications, it may be desirable to prioritize Wi-Fi communications when the vehicle is traveling at a lower speed for a sufficient period of time due to Wi-Fi generally being difficult or unreliable at speeds above a speed threshold. Blocks 126, 128, 130, 132 may be essentially identical to Blocks 115, 116, 118, 120, optionally with different preferences or requirements for selecting a host/AP. Block 134 relates to assessing a quality of service (QoS) for communications occurring through the antennas 30, 32 after establishing a Wi-Fi connection with a host/AP. The QoS assessment may include the controller 92 determining metrics and other information associated with assessing the reliability of the attendant Wi-Fi signaling, such as based on throughput, collisions, etc.

Block 136 relates to determining whether the QoS exceeds a minimum QoS threshold. The minimum QoS threshold may be associated with a preference or design parameter for facilitating Wi-Fi communications based on vehicle speed. Block 136 is shown to be separate from the key feature and location processes to demonstrate one non-limiting aspect of the present disclosure whereby different preferences may be utilized to determine when to disconnect the antennas 30, 32, i.e., when to switch from Wi-Fi to cellular communications. One contemplated preference relates to maintaining Wi-Fi communications regardless of the attendant QoS whenever the Wi-Fi communications are instigated as a result of the key feature or the location processes. Block 140 relates to the controller 92 controlling the switches 66, 68 to the first state or first position, which may be referred to as a cellular position, in response to the QoS failing to exceed the minimum QoS threshold or Blocks 112, 114, 124 being inactive or otherwise failing to indicate conditions or need for controlling the switches 66, 68 to the Wi-Fi position. The cellular position may correspond with the antennas 26, 28 and the transceiver 46 being connected to the shared cables 56, 58. The cellular position may optionally correspond with a default process or a cellular mode.

Blocks 142, 144, 146, 150, 152 relates to a triggering process for use in performing a pre-switch scanning whereby the controller 92 makes an attempt to identify available Wi-Fi networks in advance of determining a need for connecting to the Wi-Fi networks, i.e., before Blocks 112, 114, 124 indicate a need to control the switches 66, 68 to the Wi-Fi position. Block 142 relates to implementing the triggering process in response to a triggering event, such as an event indicating a likelihood of a key feature, a location, and/or a speed of the vehicle changing or trending such that a condition may reasonably arise to indicate a probability of switching to Wi-Fi, e.g., the vehicle 10 approaching a dealership or charging station, trailing components being plugged in, etc. Block 144 relates to the controller 92 temporarily actuated switches 66, 68 from the cellular position to the Wi-Fi position in order to perform a scan for available Wi-Fi networks. Block 146 relates to determining whether the Wi-Fi scan has sufficiently completed, i.e., whether a suitable number of Wi-Fi networks have been identified and/or whether particular Wi-Fi network of interest has been found. Block 150 relates to storing the scan results, i.e., generating a listing of available Wi-Fi networks for use in Block 122 to select a host/AP. Block 152 relates to the controller 92 actuating the switches 66, 68 back to the cellular position.

The present disclosure may be embodied in many different forms. Representative examples are shown in the various drawings and described herein in detail as non-limiting representations of the disclosed principles. To that end, elements and limitations described above, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the disclosure, as defined by the claims. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed:

1. A system for multiple wireless systems of a vehicle to share cabling, the system comprising:
   a plurality of first antennas included on the vehicle to interface signals with a first transceiver, the first transceiver being included as part of a first wireless system of the multiple wireless systems;
   a plurality of second antennas included on the vehicle to interface signals with a second transceiver, the second transceiver being included as part of a second wireless system of the multiple wireless systems;
   a first switch configured to selectively connect the first and second antennas to first and second cables such that the first and second transceivers share the first and second cables; and
   a second switch configured to selectively connect the first and second transceivers to the first and second cables such that the first and second transceivers share the first and second cables.

2. The system according to claim 1 further comprising a controller configured to actuate the first and second switches between at least a first state and a second state, the first state connecting each of the first antennas and the first transceiver to one of the first and second cables, the second state connecting each of the second antennas and the second transceiver to one of the first and second cables.

3. The system according to claim 2 further comprising a plurality of third antennas included on the vehicle to interface signals with the first transceiver, the third antennas each being separately connected to the first transceiver with one of a plurality of third cables, the third cables being independent of the first and second cables.

4. The system according to claim 3 further comprising a plurality of fourth antennas included on the vehicle to interface signals with a third transceiver, the fourth antennas each being separately connected to the third transceiver with one of a plurality of fourth cables, the fourth cables being independent of the first, second, and third cables, the third transceiver being included as part of a third wireless system of the multiple wireless systems.

5. The system according to claim 4 wherein the first transceiver is a 4×4 multiple-input-multiple-output (MIMO) transceiver and the second and third transceivers are 2×2 MIMO transceivers.

6. The system according to claim 5 wherein the first and second switches are double pole, double throw (DPDT) switches.

7. The system according to claim 6 wherein the controller includes a computer readable storage medium and a processor, the storage medium including a plurality of non-transitory instructions executable with the processor to selectively control the first and second switches between the first and second states.

8. The system according to claim 7 wherein the non-transitory instructions are configured to:
   implement a key feature process for controlling the first and second switches to the second state in response to determining the vehicle to be requesting usage of a key feature;
   implement a location process for controlling the first and second switches to the second state in response to determining the vehicle to be within a range of a known wireless access point (AP); and
   implement a speed process for controlling the first and second switches to the second state in response to determining the vehicle to be traveling at a speed below a speed threshold.

9. The system according to claim 8 wherein the non-transitory instructions are configured to:
   control the first and second switches to the second state regardless of a quality of service (QoS) for signaling associated with the second antennas when implementing either of the key feature and the location processes; and
   control the first and second switches from the second state to the first state in response to the QoS failing to meet a QoS threshold when implementing the speed process.

10. The system according to claim 8 wherein the non-transitory instructions are configured to implement a host selection process as part of each of the key feature, location and speed processes, the host selection process selecting connection parameters to be provided to the second transceiver for use in establishing a connection through the second antennas with a host.

11. The system according to claim 10 wherein the non-transitory instructions are configured to implement a post-switch scanning process in response to the connection parameters being unavailable prior to implementing one of the key feature, location, and speed processes, the post-switching scanning process determining the connection parameters.

12. The system according to claim 11 wherein the non-transitory instructions are configured to implement a pre-switch scanning process in an attempt to determine the connection parameters prior to implementing one of the key feature, location, and speed processes.

13. The system according to claim 12 wherein the non-transitory instructions are configured to implement a default process for controlling the first and second switches to the first state in response to the key feature, location, and speed processes being inactive.

14. The system according to claim 13 wherein the non-transitory instructions are configured to implement a triggering process as part of the default process, the triggering process temporarily switching the first and second switches from the first state to the second state for purposes of performing the pre-switch scanning process whereafter the first and second switches are automatically switched from the second state to the first state.

15. The system according to claim 7 wherein the non-transitory instructions are configured to control the first and second switches to the first state when a cellular mode is active and to control the first and second switches to the second state when a non-cellular mode is active.

16. The system according to claim 15 wherein the non-transitory instructions are configured to deactivate the non-cellular mode and activate the cellular mode when a quality of service (QoS) for signaling occurring through the second antennas during the non-cellular mode is below a QoS threshold.

17. The system according to claim 16 wherein the non-transitory instructions are configured to implement a host selection process as part the non-cellular mode, the host selection process selecting connection parameters to be provided to the second transceiver to establish a connection through the second antennas with a host.

18. The system according to claim 17 wherein the non-transitory instructions are configured to implement a pre-switch scanning process during the cellular mode in an attempt to determine the connection parameters prior to implementing the non-cellular mode, the pre-switch scanning process including temporarily switching the first and second switches from the first state to the second state for purposes of determining the connection parameters whereafter the first and second switches are automatically switched from the second state to the first state.

* * * * *